United States Patent [19]

Muir et al.

[11] 4,219,207
[45] Aug. 26, 1980

[54] SKI SUPPORTED VEHICLE

[76] Inventors: James R. Muir; Ruby J. Muir, both of 11287 Weber St., Sunnymead, Calif. 92388

[21] Appl. No.: 962,473

[22] Filed: Nov. 20, 1978

Related U.S. Application Data

[63] Continuation of Ser. No. 839,162, Oct. 4, 1977, abandoned.

[51] Int. Cl.² ............................................. B62B 13/08
[52] U.S. Cl. ..................................... 280/21 A; 188/8
[58] Field of Search ..................... 280/21 A, 21 R, 15, 280/16, 12 H, 12 K; 188/8, 6

[56] References Cited

U.S. PATENT DOCUMENTS

| 3,044,566 | 7/1962 | Mayr | 188/6 |
| 3,140,099 | 7/1964 | Fen | 280/21 A |
| 3,370,862 | 2/1968 | Huffnagle | 280/21 R |
| 4,063,746 | 12/1977 | Hansen | 280/21 R |

Primary Examiner—Robert R. Song
Attorney, Agent, or Firm—John H. Crowe

[57] ABSTRACT

A maneuverable ski machine is provided having a seat frame supported by spaced skis and individual manual controls are provided for swinging the skis about vertical axes into "snow plow" stopping or turning positions. Banking devices automatically bank the skis in proportion to the amount of swinging movement. The controls are also effective to swing and bank the skis into "parallel" turning positions and to properly laterally locate the skier's center of gravity during execution of parallel turns.

8 Claims, 10 Drawing Figures

SKI SUPPORTED VEHICLE

This is a continuation of application Ser. No. 839,162, filed Oct. 4, 1977, now abandoned.

BACKGROUND OF THE INVENTION

1. Field of the Invention

This invention relates to ski supported vehicles and has particular reference to a maneuverable ski machine in which the skier rides in a sitting position with manipulatable controls for causing the machine to execute turns or to slow or to stop.

2. Description of the Prior Art

In the art of skiing, it is well known that a fundamental maneuver in controlling skis is the so-called "snow plow" in which the skis converge toward at each other at their tips and are banked oppositely about their longitudinal axes. This setting of the skis basically effects slowing or stopping. However, by shifting one of the skis toward a position parallel to the remaining ski which is in such "snow plow" position, a turning effect can be made in the direction of the latter ski. This is a basic turning procedure which is typically followed particularly by novice skiers prior to mastering more sophisticated types of turns.

Ski vehicles or sleds in which the skier rides in a sitting position have been proposed heretofore with means for controlling turning of the same. The U.S. patents to Sampsell U.S. Pat. No. 2,323,847; Basso U.S. Pat. No. 2,589,764; Schwartz U.S. Pat. No. 3,528,674 and Cantelli U.S. Pat. No. 3,081,107 exemplify such prior type controllable ski sleds. However, in all prior controllable ski vehicles which applicant is aware of, the skis are merely banked or tilted in a parallel manner about their longitudinal axes to effect a turning movement. Although this turning effect is generally satisfactory, it cannot produce relatively sharp turns. Also, the procedure requires additional manual skill in properly shifting the body weight to effect turning and further requires additional means of some type to effect slowing or stopping of the sled.

SUMMARY OF THE INVENTION

It therefore becomes a principal object of the present invention to provide a maneuverable ski machine in which the skis are mechanically maneuvered in a manner similar to that followed by a skier mounted on skis in a conventional standing position.

Another object is to provide a maneuverable ski machine in which the skis can be controlled to assume a "snow plow" position.

Another object is to provide a maneuverable ski machine in which the skis can be selectively controlled to execute either "snow plow" or "parallel" turns.

Another object is to provide a maneuverable ski machine in which the center of gravity of the skier is automatically shifted toward the inside ski when executing a turn.

A further object is to provide a maneuverable ski machine in which the controls therefor are arranged to cause the skier to appropriately shift his weight to enable greater forward speed and to better control the sled during turns.

A still further object is to provide a maneuverable ski machine having brakes which are fail-safe, i.e. they become effective when released by the skier.

According to the present invention a maneuverable ski machine is provided having a seat frame supported on a pair of spaced skis through pivotal connections enabling the skis to be swung between parallel running positions and converging "snow plow" positions, the skis being automatically banked greater amounts in opposite directions as they are swung further outward. Individual controls are provided for the skis and when one ski is swung a greater amount than the other the machine will execute a "snow plow" turn. However, when only one ski is swung to "snow plow" position, the other will follow in substantially parallel manner and will bank in the same direction to execute a "parallel" turn.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figure 1:
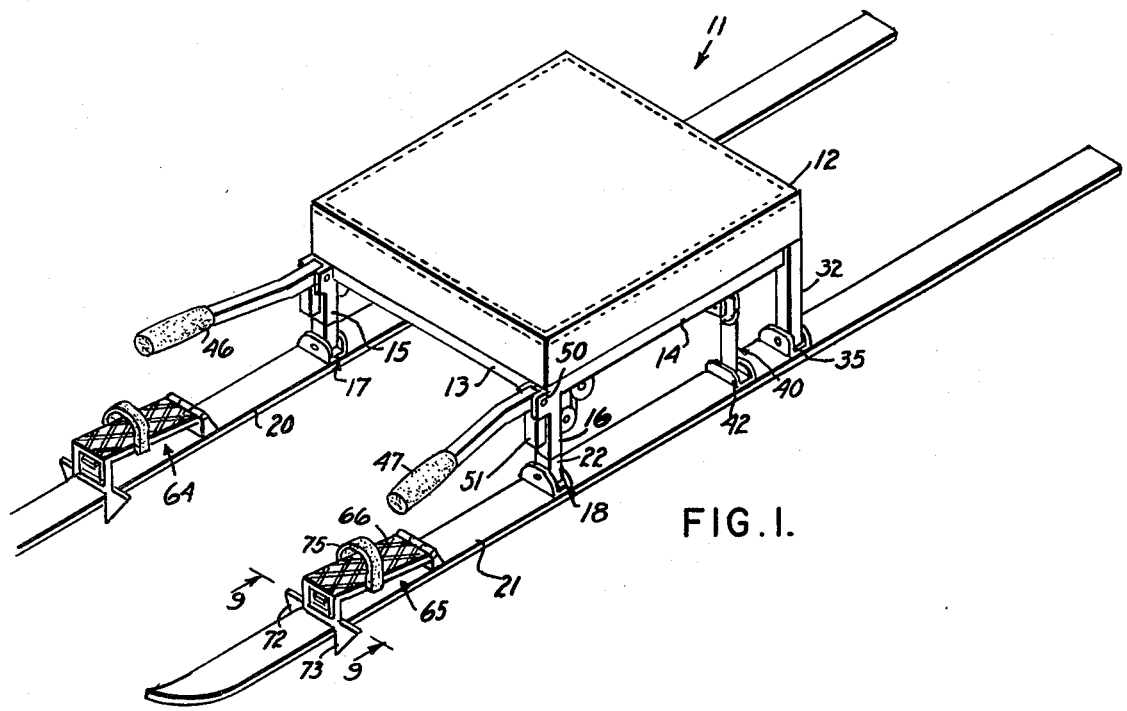
FIG. 1 is a front perspective view of a ski machine embodying a preferred form of the present invention.

Referring to the drawings, the ski machine embodiment of the present invention is generally indicated at 11 and comprises a cushioned seat 12 for supporting a skier in seated position. The seat 12 has a rigid bottom portion suitably secured to a U-shaped frame member 13, the legs 14 of which are hollow. Vertically extending legs 15 and 16 are integrally connected to the outer forward ends of the frame 13 and are supported through swivel connections 17 and 18 by a pair of skis 20 and 21, respectively.

Figure 6:
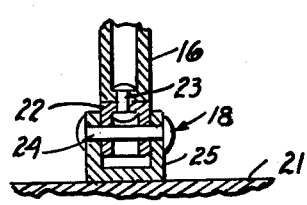
FIG. 6 is an enlarged sectional elevation view through the front swivel support for one of the skis.

As shown in FIG. 6, each swivel connection, i.e. 18, comprises a pivot element 22 connected to the lower end of the respective leg, i.e. 16, by a pivot pin 23 for pivotal movement about a vertical axis and connected by a pin 24 to a U-shaped bracket 25 suitably secured to the respective ski, i.e. 21, for pivotal movement about a horizontal axis extending parallel to the length or longitudinal axis of the ski.

A hollow frame tube 26 is suitably attached to the frame 13 by brackets 29 for slidably supporting a pair of telescoping support bars 27 and 28. Such bars are of equal length and are pivoted at 30 and 31 to rear support legs 32 and 33, respectively, permitting pivotal movement of the legs about vertical axes relative to the bars 27 and 28.

The lower end of the leg 32 is pivoted at 34 to a U-shaped bracket 35 suitably secured to the ski 21, permitting pivotal movement of the ski about an axis parallel to the length thereof. The lower end of the leg 33 is similarily pivoted at 36 to a bracket 37 secured to the ski 20.

Figure 2:
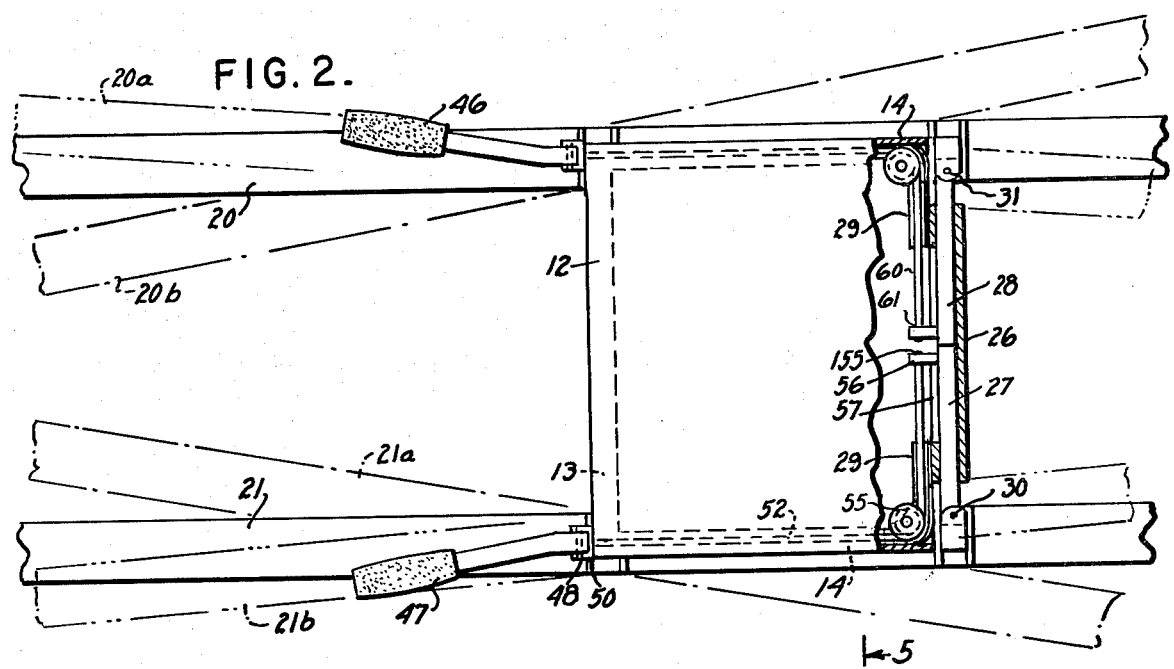
FIG. 2 is a plan view of the ski machine with parts in section and parts broken away.
Figure 4:
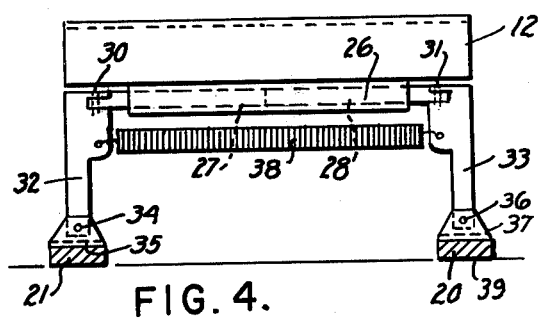
FIG. 4 is a sectional rear elevation view of the ski machine and is taken along the line of 4—4 of FIG. 3.

A spring 38 is tensioned between the legs 32 and 33 to normally hold the telescoping support bars 27 and 28 in their innermost positions illustrated in FIGS. 2 and 4 in abutting engagement with each other whereby to normally maintain the ski 20 and 21 parallel to each other and to the length of the sled.

Figure 7:
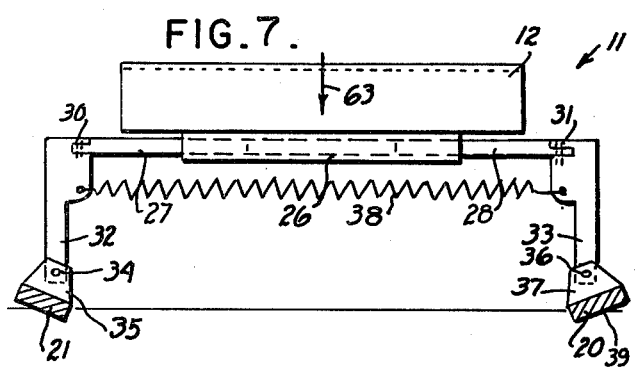
FIG. 7 is a sectional rear elevation view similar to FIG. 4 but illustrating the skis in a "snow plow" position.
Figure 3:
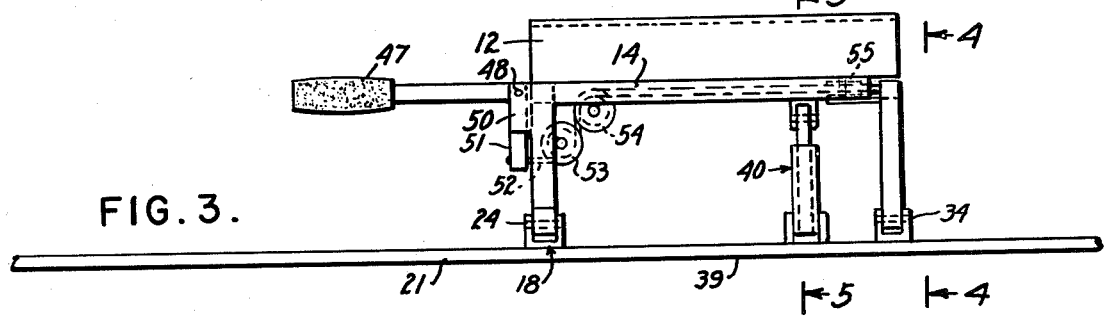
FIG. 3 is a side view of the ski machine.
Figure 5:
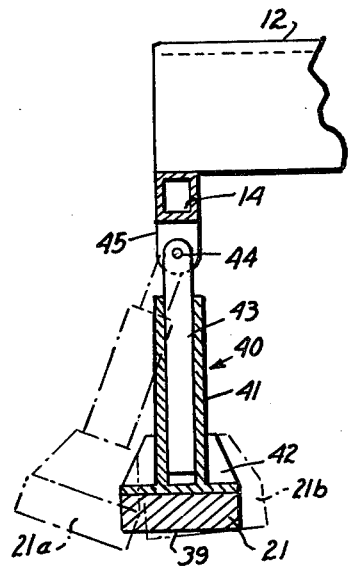
FIG. 5 is an enlarged sectional elevation view through one side of the ski machine and is taken along the line 5—5 of FIG. 3.

Means are provided for normally maintaining the skis with their under supporting surfaces 39 in a horizontal plane, as seen in the full lines of FIGS. 4 and 5, and for banking the same when executing a turn as will be described later. For this purpose, telescoping guide or banking devices, i.e. 40, are provided for both skis 20 and 21. Such devices are similar and the one shown in FIGS. 3 and 5 comprises a tube 41 rigidly connected, as by welding, to a bracket 42 suitably attached to the ski 21. A second tube 43 is slidably fitted within the tube 41 and is pivoted at 44 to a bracket 45, integral with the leg 14 of seat frame 13, for pivotal movement about a horizontal axis extending parallel to the length of the sled. It will be seen that as the rear end of the ski 21 is swung outwardly about its forward swivel pin 23 from its "forward running" position toward its dot-dash line position 21a, (FIGS. 2 and 5), the banking device 40 will cause it to bank or tilt clockwise (when viewed from the rear as seen in FIGS. 5 and 7) about the axes of the pivots 24 and 34. Also, it will be noted that the angle of bank of the ski will automatically increase as it is swung outward from its forward running position. Likewise, when the ski 21 is moved inwardly from its normal "forward running" position it will be banked counterclockwise to assume a position shown by the dot-dash lines 21b of FIG. 5.

Means are provided under control of the skier to selectively and individually or jointly locate the skis 20 and 21 in forwardly converging positions to assume a "snow plow" stopping or turning setting or to locate the skis in substantially parallel positions to assume a "parallel" turning setting. For this purpose, a pair of control levers 46 and 47 are provided for independently controlling respective ones of the skis 20 and 21. Lever 47 is pivoted at 48 to a bracket 50 integral with the frame leg 16 for movement about a horizontal axis. A depending arm 51 of lever 47 is connected to one end of a cable 52 which is reeved in succession over pulleys 53, 54 and 55, FIGS. 2 and 3, rotatably supported in a suitable manner by the frame 13. The cable is guided through the hollow frame leg 14 between the pulleys 54 and 55. The opposite end of the cable 52 is attached at 155 to a projection 56 attached to the telescoping support bar 27 and slidable within a slot 57 formed along the length of the frame tube 26.

The control lever 46 is similarly supported for pivotal movement about a horizontal axis and is connected by a cable 60 guided over a pulley system similar to the pulleys 53, 54 and 55, the opposite end of the cable 60 being attached to a projection 61 attached to the telescoping bar 28 and movable within the slot 57.

Thus, when the left hand control lever 47 is pulled upwardly, the bar 27 will be drawn to the left, as viewed in FIG. 4, causing the ski 21 to pivot about the vertical pivot pin 23 of the forward pivot member 22 toward its dot-dash "snow plow" position 21a of FIG. 2. Concurrently, as the ski 21 swings into its "snow plow" position, the banking device 40 banks the same about its longitudinal axis to assume its position illustrated in dot-dash lines 21a in FIG. 5 and in full lines in FIGS. 7 and 8.

On the other hand, when the control lever 46 is pulled upwardly concurrently with lever 47, the ski 20 will be swung about the axis of the forward supporting leg 15 into its dot-dash line position 20b. Accordingly, the skis 20 and 21 will converge forwardly to assume a full "snow plow" setting to slow down or stop the forward movement of the machine. In this case, the skis will be oppositely banked as seen in FIG. 7. By raising one of the levers 46 and 47 a greater amount than the other, the respective ski will be both banked and pointed or toed inwardly a greater amount than the other, causing a "snow plow" turn in the direction of the ski which is so turned.

Figure 8:
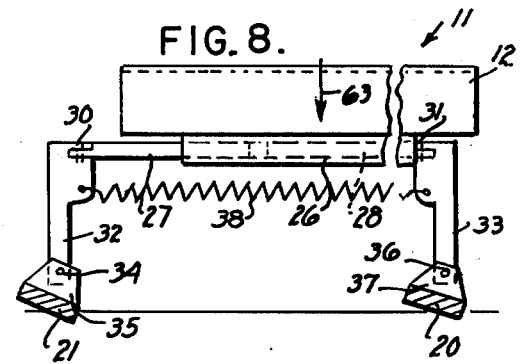
FIG. 8 is a sectional view similar to FIGS. 4 and 7 but illustrating the skis in a right parallel turn position.

However, when one of the control levers, for example, lever 47 is pulled upward and the other lever, i.e. lever 46, is allowed to remain in its normal lowered position, the spring 38 will cause the telescoping support bar 28 to follow the bar 27 beyond its normal "forward running" position shown in FIG. 4, thereby enabling the right rear support leg 33 to move to the left beyond its position shown in FIG. 4 to that shown in FIG. 8 and wherein the rear support legs 32 and 33 and skis 20 and 21 assume their positions shown in FIG. 8 relative to each other and to the seat 12. That is, as the leg 33 moves leftward the banking device for ski 20 will now bank such ski in a clockwise direction. Accordingly, it will be noted that both skis are now pointed in substantially the same direction and are both banked in the same clockwise direction about their longitudinal axes to execute a right hand "parallel turn". Leftward movement of the leg 33 is limited by engagement of a portion thereof with the right hand end of the guide tube 26. Correspondingly, rightward movement of the leg 32 is limited by engagement thereof with the left hand end of the tube 26.

Figure 9:
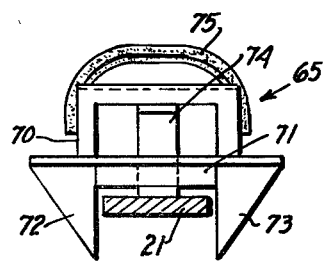
FIG. 9 is a sectional front view illustrating one of the brakes and is taken along line 9—9 of FIG. 1.
Figure 10:
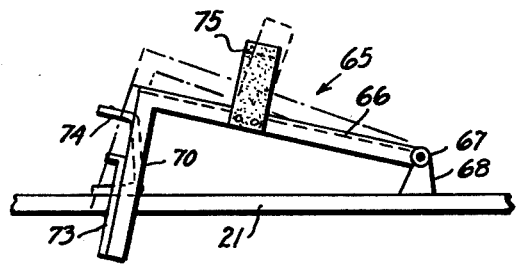
FIG. 10 is a side view of the brake shown in FIG. 9.

It will also be noted in FIG. 8 that due to the aforementioned leftward shifting of the rear ends of the skis to execute a right hand parallel turn, the center of gravity of the skier, as indicated by an arrow 63 passing centrally and vertically through the seat 12, will in effect be shifted rightward toward the ski, i.e. 20, located on the inside of the turn. A corresponding effective leftward shift of the skier's center of gravity will occur during a left hand parallel turn. Combined foot rests and brakes generally indicated at 64 and 65, FIGS. 1, 9 and 10, are attached to the forward portions of the skis 20 and 21 to enable independent or conjoint braking of the skis to either stop the machine or execute turns by applying a drag on either ski. Such brakes 64 and 65 are similar to each other and each comprises a foot pedal 66 pivoted at 67 at its rear end for movement about a horizontal axis on a bracket 68 suitably attached to the respective ski, i.e. 21. The foot pedal 66 is integral with a depending inverted U-shaped frame 70 which straddles the ski 21. Such frame comprises a cross member 71 and triangular vane elements 72 and 73 which may penetrate the snow at different depths below the ski and thus provide variable braking. A U-shaped limit stop 74 is suitably secured to the ski 21 to limit vertical movement of the cross member 71 and thus limit the upper and lower positions to which the pedal 66 may be moved. A toe strap 75 is secured to the pedal 66 to receive the skier's foot.

In operation, the skier inserts his foot under the toe strap 75 and can thus rest the heel of his foot on the portion of the pedal 66 adjacent hinge 67 while either holding the brake out of braking position or allowing the same to drop into such braking position. When unattended, the weight of the pedal 66 causes the vane elements 72 and 73 to penetrate the snow and thus maintain the machine in braked position. Accordingly, if the skier should fall off the seat the brakes would be automatically applied.

The control levers 46 and 47 are located in relatively low positions so that the skier tends to bend forwardly while traveling in free running condition, thus placing a greater amount of his weight on the front portions of the skis to obtain maximum speed. However, when executing a turn or in slowing the machine, he would naturally shift his weight rearwardly to raise the levers 46 and 47, thus providing better control of the machine during such times.

The foregoing construction, resulting in the seat 12 being raised with an open space thereunder, enables a motor driven propulsion unit (not shown) to be mounted under the seat.

It will be noted that the described ski machine enables the center of gravity of the skier to be lower and the skis to be spaced further apart than the skier could otherwise comfortably hold them when in standing position, thereby providing increased safety and stability. It will be obvious to those skilled in the art that many variations may be made in the exact structure shown without departing from the spirit and scope of this invention. For example, although the machine is particularly intended for use on snow, it could, with obvious modifications, be used on water in which case the pedals 66 could be suitably fixed in upper non-braking positions and thus form foot rests only. A tow rope (not shown) could be attached at a forwardly extending tow bar (also not shown) which could be attached to the frame 13, to draw the sled over the water.

I claim:
1. A ski machine comprising:
   a frame including a seat;
   a pair of spaced skis;
   means supporting said frame on said skis;
   individual manually controlled means for swinging respective ones of said skis from parallel running positions to forwardly converging positions;
   means responsive to said swinging of said skis toward said forwardly converging positions for banking said skis; and
   means responsive to movement of a first one only of said skis to said converging position to cause the other of said skis to swing to a position at least substantially parallel to said first ski.
2. A ski machine as defined in claim 1 comprising means whereby said banking means is effective upon swinging of said second ski to said parallel position to bank said second ski at an angle at least substantially parallel to the angle of bank of said first ski.
3. A ski machine as defined in claim 1 wherein said last mentioned means comprises means for shifting said skis laterally relative to said seat.
4. A ski machine comprising:
   a frame including a seat;
   a pair of spaced skis;
   means supporting said frame on said skis;
   individual manually controlled means for swinging respective ones of said skis from parallel running positions to forwardly converging positions; and
   means responsive to said swinging of said skis toward said forwardly converging positions for banking said skis;
   said frame supporting means comprising;
   first means pivotally connecting said skis to said frame for swinging movement about first vertical axes;
   a pair of support devices;
   means mounting said support devices on said frame for lateral movement relative to said frame;
   second means pivotally connecting said skis to respective ones of said support devices for swinging movement about second vertical axes spaced along the length of said skis from said first axes; and
   means operable by said manually controlled means for independently moving said support devices relative to said frame whereby to swing said skis to different forwardly converging positions.
5. A ski machine as defined in claim 4 wherein said first means is located adjacent the front of said frame and said second means is located adjacent the rear of said frame, and
   said manually controlled means comprises manually operable members extending forwardly of said frame.
6. A ski machine as defined in claim 5 comprising yieldable means tending to move said support devices in concert with each other whereby to swing said skis into at least substantially parallel positions relative to said frame.
7. A ski machine as defined in claim 6 wherein said yieldable means normally engages said support devices together whereby to maintain said skis in said parallel positions.
8. A ski machine comprising:
   a frame including a seat;
   a pair of spaced skis;
   means supporting said frame on said skis;
   brake pedals for respective ones of said skis;
   means pivotally supporting each of said pedals at the rear thereof on a respective one of said skis for movement about a horizontal axis; and
   a braking element at the forward end of each of said pedals;
   said pedals being operable by gravity to engage said braking elements with a ski supporting surface; and
   means for enabling a skiers feet to hold said pedals against gravity whereby to maintain said braking elements out of engagement with said ski supporting surface.

* * * * *